(12) United States Patent
Matsui

(10) Patent No.: US 8,879,721 B2
(45) Date of Patent: Nov. 4, 2014

(54) AUDIO COMMUNICATION SYSTEM

(75) Inventor: Takeshi Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 2254 days.

(21) Appl. No.: 11/680,665

(22) Filed: Mar. 1, 2007

(65) Prior Publication Data

US 2007/0206778 A1 Sep. 6, 2007

(30) Foreign Application Priority Data

Mar. 1, 2006 (JP) ................. P2006-054331

(51) Int. Cl.
*H04M 9/08* (2006.01)

(52) U.S. Cl.
CPC .................. *H04M 9/082* (2013.01)
USPC ................. 379/406.12; 379/406.16

(58) Field of Classification Search
CPC ............ H04M 9/082; H04B 3/20; H04B 3/23
USPC .............. 379/406.01–406.16; 381/71.1–71.4; 370/286–296; 455/570
See application file for complete search history.

(56) References Cited

U.S. PATENT DOCUMENTS

| | | | | |
|---|---|---|---|---|
| 3,943,511 A | * | 3/1976 | Evans et al. ...................... | 342/94 |
| 4,117,277 A | * | 9/1978 | van den Elzen et al. . | 379/406.08 |
| 4,594,479 A | * | 6/1986 | Farrow et al. ...................... | 379/3 |
| 5,222,084 A | * | 6/1993 | Takahashi ...................... | 370/290 |
| 5,899,977 A | * | 5/1999 | Nakamura ...................... | 704/278 |
| 6,259,680 B1 | * | 7/2001 | Blackwell et al. ............ | 370/286 |
| 6,694,018 B1 | * | 2/2004 | Omori ...................... | 379/406.03 |
| 7,212,628 B2 | * | 5/2007 | Popovic et ............... | 379/406.08 |
| 2005/0207596 A1 | * | 9/2005 | Beretta et al. ................. | 381/111 |

FOREIGN PATENT DOCUMENTS

| | | |
|---|---|---|
| JP | 06-141316 | 5/1994 |
| JP | 07-303067 | 11/1995 |
| JP | 08-321796 | 3/1996 |
| JP | 08-213940 | 8/1996 |
| JP | 09-506217 | 6/1997 |
| JP | 2002-262251 | 9/2002 |
| WO | WO 95/11566 | 4/1995 |

OTHER PUBLICATIONS

Japanese Office Action issued on Feb. 24, 2009, for corresponding Japanese Patent Application JP 2006-054331.
Japanese Office Action issued on May 26, 2009, for corresponding Japanese Patent Application 2006-054331.

* cited by examiner

*Primary Examiner* — Akelaw Teshale
(74) *Attorney, Agent, or Firm* — K&L Gates LLP

(57) ABSTRACT

An audio communication system includes a first analog/digital convertor, a second analog/digital convertor, and an echo canceller. The first analog/digital convertor converts an audio signal, which is input from a microphone, to a data signal. The second analog/digital convertor that converts an audio signal, which is input from an auxiliary input terminal, to a data signal. When an audio signal transmitted from the outside is received and output from a speaker, the echo canceller prevents an output of the speaker from being input through the microphone and echoed back to a recipient or remote device. An operating frequency of the echo canceller is relatively lower than a sampling frequency of the second analog/digital convertor.

5 Claims, 3 Drawing Sheets

REGULAR FIR FILTER

DOWNSAMPLING FIR FILTER
(NUMBER OF OUTPUT CALCULATIONS: HALF)

UPSAMPLING FIR FILTER (1)
(NUMBER OF PRODUCT-SUM OPERATIONS: HALF)

UPSAMPLING FIR FILTER (2)
(NUMBER OF PRODUCT-SUM OPERATIONS: HALF)

AUDIO COMMUNICATION SYSTEM

CROSS REFERENCES TO RELATED APPLICATIONS

The present application claims priority to Japanese Patent Application JP 2006-054331 filed in the Japanese Patent Office on Mar. 1, 2006, the entire contents of which being incorporated herein by reference.

BACKGROUND

The present application relates to an audio communication system that performs transmission and reception, i.e., communication of audio signals having high sound quality.

FIG. 3 shows one example of previously proposed or existing audio communication systems, such as video conference or phone units or systems (unless otherwise specifically stated or mentioned, the term "audio" hereinbelow is used to refer to any one of such terms "voice" and "speech"). An auxiliary input terminal 101 (AUX) is a terminal for connecting a sound source, such as CD (compact disk). A signal input from the auxiliary input terminal 101 (AUX) is sampled at, for example, a sampling frequency of 48 kHz, and converted by an AD convertor 201 (ADC) into a digital signal.

A microphone input terminal 102 (MIC) is connected to a microphone for collecting audio, for example. A signal input from the microphone input terminal 102 (MIC) is sampled at, for example, a sampling frequency of 48 kHz, and converted by an AD convertor 202 (ADC) into a digital signal. Echo output from a speaker of a remote terminal is entrained into the signal, such that an echo cancellation process is carried out using an echo canceller 402.

In the echo canceller 402, a signal component (echo) entrained into the microphone input signal from the speaker output of the remote terminal is cancelled. For cancellation of the signal component (echo), a true signal component from the remote terminal is referenced.

The microphone input signal from which the echo has been cancelled is mixed by necessity with the output of the AD convertor 201 (ADC). Thereby, a transmission signal at a sampling frequency of, for example, 48 kHz for transmission to the remote terminal is produced.

An output of an adder or summing device 602 is compressed in a compression process in an encoder 702, thereby to form a bitstream that is transmitted to the remote terminal across, for example, an IP network.

The bitstream, which has been transmitted from the remote terminal, is restored or decoded by a decoder 703, thereby being formed as a received signal of a sampling frequency of, for example, 48 kHz. The received signal from the remote terminal is mixed, by necessity, in a summing device 603 with the output of the AD convertor 201 (ADC) (signal from the auxiliary input terminal 101 (AUX)), thereby to form a source signal for a speaker output.

In the event that the source signal for the speaker output is directly DA converted and output, a case can take place in which, for example, skew occurs depending on the sound volume of the signal, or echo cancellation cannot be properly done by the echo canceller 402 when the signal is a multi-channel signal such as stereo signal. As such, before the signal is input as the reference signal into the echo canceller 402, the signal is subjected to necessary preprocesses in a preprocessor 503. The preprocess in the preprocessor 503 includes, for example, compression (quick compression of large amplitude portions of the signal) and elimination of inter-channel correlative components. Further, when the sound volume (volume) has to be tuned, also volume tuning is carried out by the preprocessor 503.

The output of the preprocessor 503 is supplied to a DA convertor 203 (DAC), and is used also as a reference signal in the echo canceller 402. In the DA convertor 203 (DAC), the output signal is restored into an analog signal at a sampling frequency of, for example, 48 kHz. Thereby, a signal within a signal band range of up to 22 kHz is output to a speaker output terminal 103 (SPK).

Recording signals can be selectively provided in the system. Recording signals include (output of the echo canceller 402) for the use of transmission of a microphone input signal of the system's own terminal to the remote terminal, a signal (output of the decoder 703) from the remote terminal, and by necessity, a signal (output of the AD convertor 201 (ADC)) incoming from the auxiliary input terminal 101 (AUX). These recording signals are mixed in a summing device 604 and are restored by a DA convertor 204 (DAC) at a sampling frequency of, for example, 48 kHz to an analog signal. Thereby, a signal within the signal band range of up to 22 kHz is produced and output to the recording terminal 104 (REC).

In the above-described example, the sampling frequencies of the AD/DA convertors are 48 kHz maximum. An audio communication system of the above-described type is disclosed in Patent Publication 1 (see Japanese Unexamined Patent Application Publication No. 2002-262251).

In the case of the sampling frequency of 48 kHz, signals within the range of up to 22 kHz can be represented. The level of audio or sounds acoustically perceptible by human beings is said to be a frequency range of up to about 20 kHz, which is reproducible with the audio of a CD or the like. However, a maximum level of sound quality level presently demanded exceeds the level of quality achievable by the example of previously proposed or existing audio communication systems. Actual sounds of musical instruments and in the natural world include sounds of significantly higher tone (frequency) than 22 kHz. It is said that when sounds in the tone range of up to such a high level are reproduced, the sound quality is apparently improved. In order to reproduce such high tone audio, the systems, contents, and the like of super-audio CDs and DVD audio are distributed and circulated among commercial markets seeking for high sound quality.

The example of the previously proposed audio communication systems described above has problems in terms of sound quality and hardware costs presently demanded, as described herebelow.

(1) Sound sources contemplated in the example of previously proposed or existing audio communication systems are specialized in CD-level equivalent audio. The sound quality of the above-described audio as a communication is sufficient for clearly understanding human speech voice. However, the sound quality is not sufficient to enable fidelity reproduction of a musical audio signal including a reproduction frequency band exceeding the level of CD audio, such as super-audio CD or DVD audio.

(2) In the case that a signal including the reproduction frequency band exceeding the level of CD audio is processed simply by the example of previously proposed methods or its enhanced method, the hardware scale is significantly enlarged. Particularly, the echo canceller indispensable for two-way audio communication requires a very large number of calculations in order to provide high performance. While the CD-level equivalent frequency band is sufficient for the reproduction of audio as a communication, a wide reproduction frequency band of the echo canceller has to be provided corresponding to musical audio signals inclusive of CD-level exceeding reproduction frequency band. This leads to a significant cost increase.

SUMMARY

According to one embodiment, an audio communication system includes a first analog/digital convertor that converts an audio signal to a data signal, the audio signal being input from a microphone; a second analog/digital convertor that converts an audio signal to a data signal, the audio signal being input from an auxiliary input terminal; and an echo canceller that, when an audio signal transmitted from the outside is received and output from a speaker, prevents an output of the speaker from being input through the microphone and echoed back to a recipient or remote device. An operating frequency of the echo canceller is relatively lower than a sampling frequency of the second analog/digital convertor.

According to the embodiment described above, the operating frequency of the echo canceller is relatively lower than the sampling frequency of the second analog/digital convertor corresponding to the auxiliary input terminal. As such, source audio of high sound quality, which is input from the auxiliary input terminal, can be transmitted at a high sampling frequency by maintaining the high sound quality. Concurrently, echo-back of audio input from the microphone can be appropriately restrained by using the echo canceller having the low operating frequency. This makes it possible to restrain the circuit size from being increased in association with enhancement in the capability of supporting the high sound quality audio.

Consequently, according to the embodiment, advantages and effects can be secured for presently demanded audio quality (sound quality) and hardware costs, as follows:

(1) In comparison with the example of previously proposed or existing audio communication systems specialized for audio or CD-level equivalent, a musical audio signal including a reproduction frequency band exceeding the level of CD audio, such as super-audio CD or DVD audio can be reproduced with fidelity.

(2) According to the example of previously proposed or existing methods or its enhanced methods, the hardware scale is significantly increased. In comparison, however, according to the embodiment, since the sampling rate convertors are appropriately used, previously proposed or existing techniques can be utilized or diverted as they are. Consequently, it is possible to prevent unnecessary increases in circuit size and cost. In comparison to the case of the echo canceller, the sampling rate convertor can be realized with a very small number of calculations, such that substantially no influence is imposed on the cost increase.

Additional features and advantages are described herein, and will be apparent from, the following Detailed Description and the figures.

DETAILED DESCRIPTION

Figure 1:
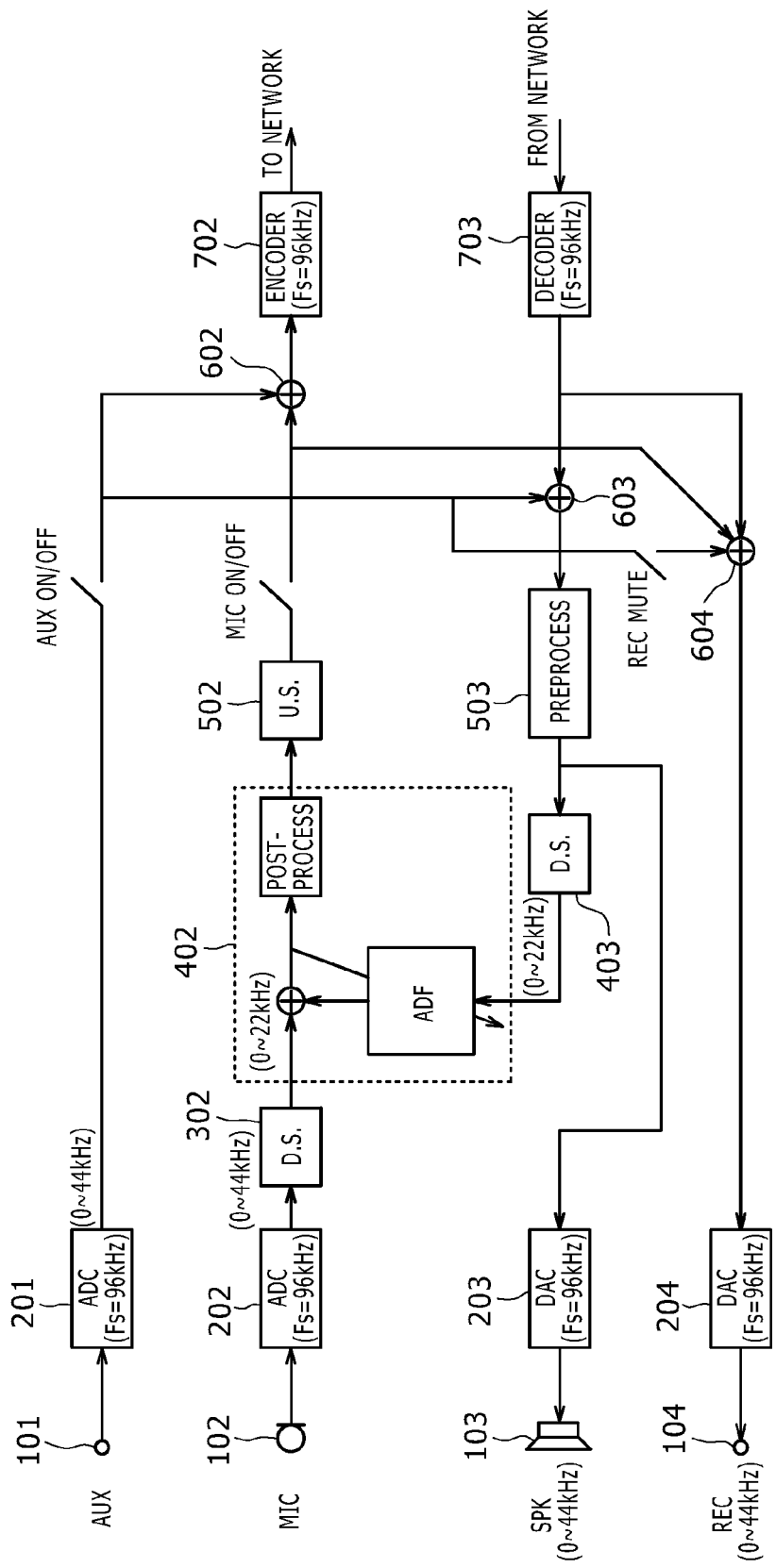
FIG. 1 is an explanatory block diagram of an audio communication system in accordance with an embodiment.

FIG. 1 is a view showing the configuration of an audio communication system in accordance with one embodiment.

An auxiliary input terminal 101 (AUX) connects a sound source of high sound quality, such as super-audio CD or DVD audio player. A signal input from the auxiliary input terminal 101 (AUX) is sampled at, for example, a sampling frequency of 96 kHz, and converted by an AD convertor 201 (ADC) into a digital signal.

A microphone input terminal 102 (MIC) is connected to a microphone for collecting audio, for example. A signal input from the microphone input terminal 102 (MIC) is sampled at, for example, a sampling frequency of 96 kHz, and converted by an AD convertor 202 (ADC) into a digital signal.

A sampling rate convertor 302 (D.S.) (for downsampling) is a circuit that performs sampling rate conversion (downsampling) for a microphone input signal. More specifically, the circuit downsamples a signal sampled at the sampling frequency of 96 kHz to reduce the sampling frequency to 48 kHz. Echo output from a speaker of a remote terminal is entrained into the signal, such that an echo cancellation process is carried out using an echo canceller 402.

In the echo canceller 402, a signal component (echo) entrained into the microphone input signal from the speaker output of the remote terminal is cancelled. For cancellation of the signal component, a true signal component from the remote terminal is referenced.

The microphone input signal from which the echo has been cancelled is upsampled by a sampling rate convertor 502 (U.S.) (for upsampling) to be 96 kHz. In this case, while only the sampling frequency is increased, the frequency band of the signal remains unchanged.

An output of the sampling rate convertor 502 is mixed at the adder or summing device 602 by necessity with the output of the AD convertor 201 (ADC). Thereby, a transmission signal at the sampling frequency of 96 kHz for transmission to the remote terminal is produced.

An output of a summing device 602 is compressed in a compression process in an encoder 702, thereby to form a bitstream that is transmitted to the remote terminal across, for example, an IP network.

The bitstream, which has been transmitted from the remote terminal, is restored or decoded by a decoder 703, thereby being formed as a received signal of the sampling frequency of 96 kHz. The received signal from the remote terminal is mixed by necessity in a summing device 603 with the output (auxiliary input (AUX) signal) of the AD convertor 201 (ADC), thereby to form a source signal for a speaker output.

In the event that the source signal for the speaker output is directly DA converted and output, a case can take place in which, for example, skew occurs depending on the sound volume of the signal, or echo cannot be properly cancelled by the echo canceller 402 when the signal is a multichannel signal such as stereo signal. As such, before the signal is input as the reference signal into the echo canceller 402, the signal is subjected to necessary preprocesses in a preprocessor 503. The preprocess in the preprocessor 503 includes, for example, compression (quick compression of large amplitude portions of the signal) and elimination of inter-channel relative components. Further, when the sound volume (volume) has to be tuned, also volume tuning is carried out by the preprocessor 503.

The output (signal) of the preprocessor 503 is supplied to a DA convertor 203 (DAC), and is also supplied to a sampling rate convertor 403 (D.S.) for use as a reference signal in the echo canceller 402. Thereby, the output signal of the preprocessor 503 is converted in the sampling frequency to 48 kHz, thereby becoming a signal limited in the band to 22 kHz or lower. Signals for speaker output are not supplied to the sampling rate convertor 403 (downsampler (D.S.)), such that a signal from the remote terminal and the signal from the auxiliary input terminal 101 (AUX) are not impaired in their respective original signal components.

In the DA convertor 203 (DAC), the output signal of the preprocessor 503 is restored into an analog signal at the sampling frequency of 96 kHz. Thereby, a signal within a signal band range of up to 44 kHz is output to a speaker output terminal 103 (SPK).

Recording signals can be selectively provided in the system. Recording signals include a signal (output of the echo canceller 402) for the use of transmission of a microphone input signal of the system's own terminal to the remote terminal, a signal (output of the decoder 703) from the remote terminal, and by necessity, a signal (output of the AD convertor 201 (ADC)) from the auxiliary input terminal 101 (AUX). These recording signals are mixed in a summing device 604 and is restored by a DA convertor 204 (DAC) at the sampling frequency of 96 kHz to an analog signal. Thereby, a signal a within the signal band range of up to 44 kHz is produced and output to the recording terminal 104 (REC).

The audio communication system of the present embodiment is configured as described above. According to the system, a musical audio signal including a reproduction frequency band exceeding the level of CD audio, such as super-audio CD or DVD audio, is input from the auxiliary input terminal 101 (AUX), and can be transmitted with high sound quality maintained. This can be done in accordance with the sampling frequency of the AD convertor 201 (ADC) that corresponds to high sound quality. The audio input from the microphone input terminal 102 (MIC) is downsampled via the sampling rate convertor 302 and then input into the echo canceller 402 corresponding to a low operating frequency. As such, a circuit having the same scale as that in the example of the previously proposed or existing techniques can be used for the echo canceller 402, consequently making it possible to prevent, for example, unnecessary increases in circuit area size and cost.

Sampling rate convertors will now be described in detail hereinbelow. FIGS. 2A to 2D, respectively, are explanatory views of sampling rate convertors. In the present embodiment, the respective sampling rate convertor is realized as an adaptation of an FIR (finite impulse response) filter. Generally, the FIR filter is represented by Equation (1) below.

$$y_k = h_0 x_k + h_1 x_{k-1} + \ldots + h_{n-1} x_{k-(n-1)} \quad (1)$$

where k is an integer representing time; $y_k$ is an output at time k; $x_k$ is an input at time k; and $h_0, \ldots, h_{n-1}$ is a respective FIR filter coefficient in a number-of-taps n.

In this case, in the case of the sampling frequency of 96 kHz, time k corresponds to each cycle of 96 kHz.

First, the downsampling dedicated sampling rate convertor will be described hereinbelow. In the present embodiment, downsampling is the process of reducing the sampling frequency from 96 kHz to 48 kHz (refer to FIG. 2B). Since the sampling frequency on the output side is 48 kHz, the audio band has to be substantially fully cut off to 24 kHz or below According to practical filter characteristics, signals in the frequency range of up to 22 kHz are passed through, signals in the frequency range of from 22 kHz to 24 kHz are transitionally attenuated, and signals in the frequency range of 24 kHz or above are cut off. Since the original sampling frequency of the input is 96 kHz, a filter coefficient is selected that has characteristics limiting the sampling frequency of the original signal to ¼ or below with respect to the sampling frequency of the input.

In the case that the frequency can be substantially fully cut off by the filtering process to 24 kHz or above, downsampling can be implemented in the manner that decimation for removing only one sample is subsequently applied on two samples of the filter output. Since the decimation of the output is carried out, in the product-sum operation of Equation (1), the output (lefthand part) does not have to be calculated for one of two samples. More specifically, the number of calculations can be reduced to half by using Equation (2) below.

$$y_{2k} = h_0 x_{2k} + h_1 x_{2k-1} + \ldots + h_{n-1} x_{2k-(n-1)} \quad (2)$$

where k is an integer representing time; $y_k$ is an output at time k of the original sampling frequency (96 kHz); $x_k$ is an input at time k; and $h_0, \ldots, h_{n-1}$ is a respective FIR filter coefficient in the number-of taps n. Since the lefthand part is the output after downsampling, the number itself of Equation (2) is half with respect to the time of the original sampling frequency.

Figure 2A:
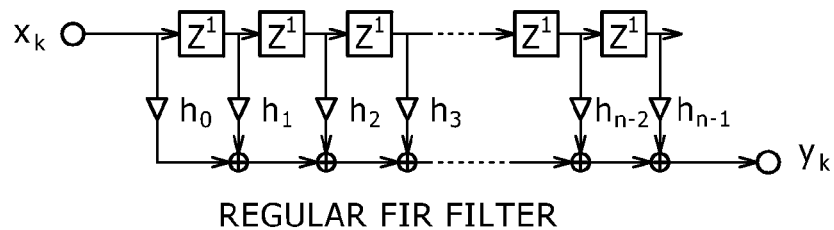
FIGS. 2A to 2D are explanatory views of sampling rate convertors in accordance with of the embodiment.
Figure 2B:
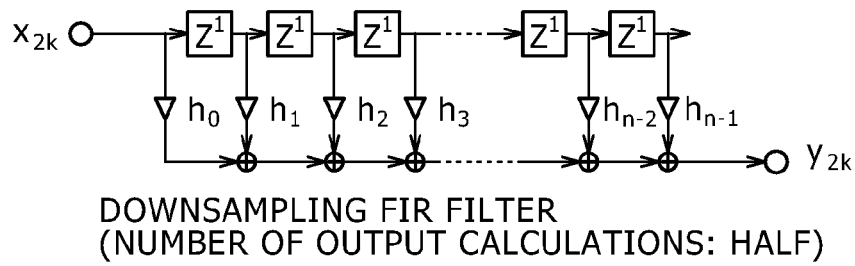
Figure 2C:
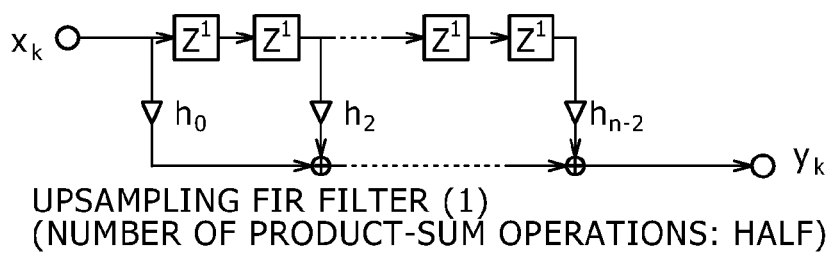
Figure 2D:
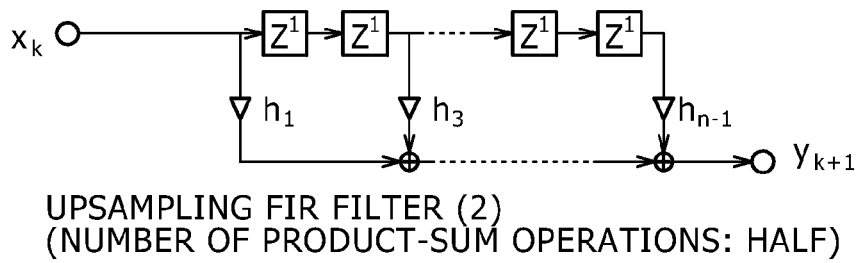
Figure 3:
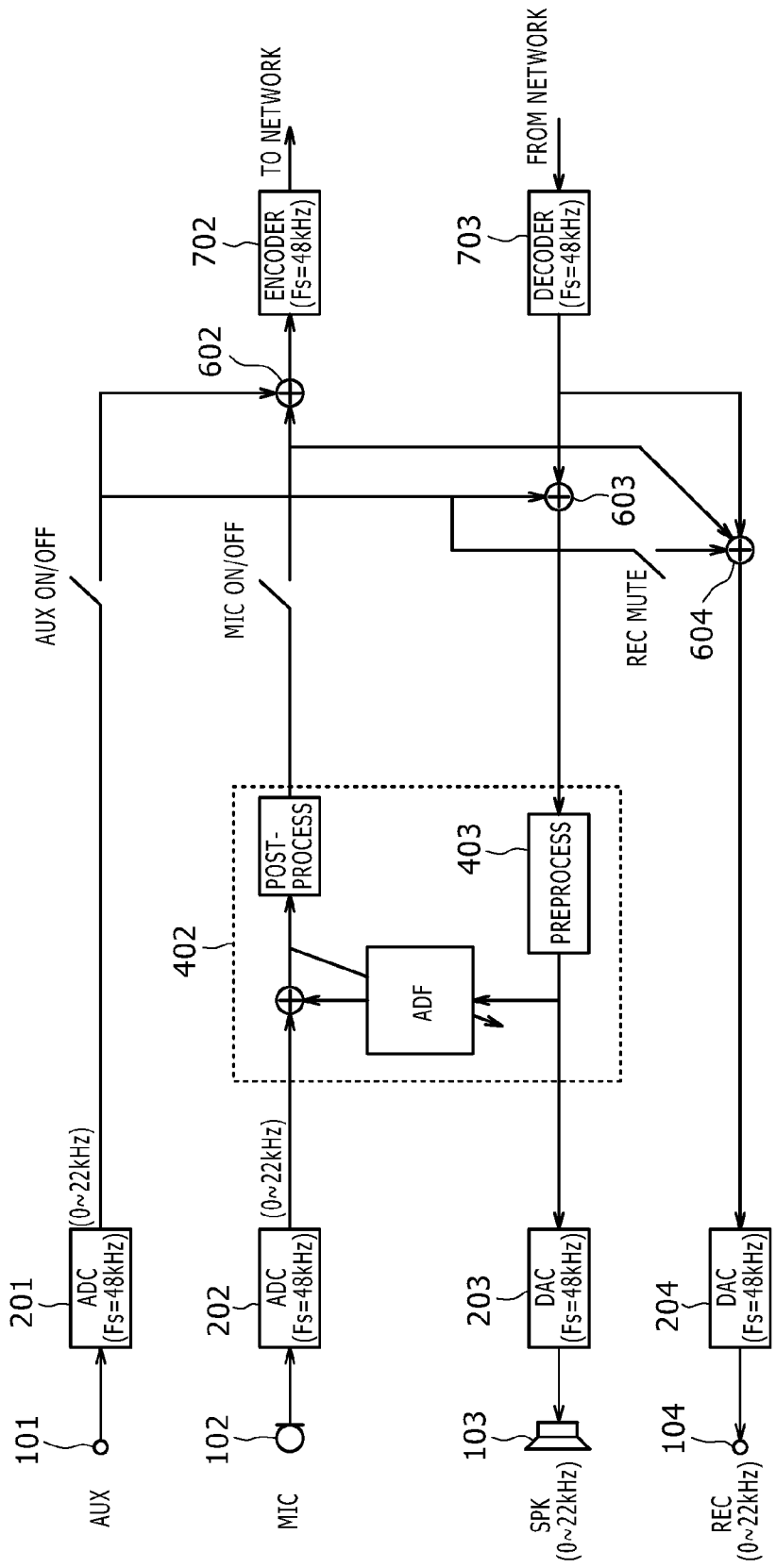
FIG. 3 is an explanatory block diagram of an example of previously proposed or existing audio communication systems.

Next, the upsampling dedicated sampling rate convertor will be described hereinbelow (refer to FIGS. 2C and 2D). In the present embodiment, upsampling is the process of increasing the sampling frequency from 48 kHz to 96 kHz. Since the number of samples of the output signal is twice that of the input signal, one zero signal is inserted between each of the samples, thereby to perform the filtering process. With the zero signals are thus inserted, while high frequency components are included, a filter coefficient is selected that has characteristics limiting the sampling frequency to ¼ or below with respect to the sampling frequency (96 kHz) of the input, similarly as in downsampling. Thereby, with the original signal components are left as they are, only the number of samples can be doubled.

Thus, the number of samples in the input signal is doubled, and the ostensible sampling frequency is doubled to 96 kHz. However, it is already known that one of two signals is 0 in value, such that the result of one of two righthand parts in the product-sum operation of Equation (1) is 0. More specifically, the number of calculations can be reduced to half by using Equations (3.1) and (3.2) below.

$$y_k = h_0 x_k + h_2 x_{k-2} + \ldots + h_{n-2} x_{k-(n-2)} \quad (3.1)$$

$$y_{k+1} = h_1 x_k + h_3 x_{k-2} + \ldots + h_{n-1} x_{k-(n-2)} \quad (3.2)$$

where $y_k$ is an output at time k after upsampling; $x_k$ is an input at time k after upsampling (after insertion of the zero signal); and $h_0, \ldots, h_{n-1}$ is a respective FIR filter coefficient in the number-of taps n. Since the sampling frequency of the input is 48 kHz, Equations (3.1) and (3.2) are executed in the cycle of 48 kHz. That is, in each cycle of 96 kHz, one of Equations is alternately executed. The number of righthand parts is half, so that the number of product-sum operations is half with respect to that of Equation (1).

The sampling rate convertor described above can thus be realized by the simple circuit configuration. As such, even in a configuration in which the sampling rate convertors are provided on the front and rear sides of the echo canceller 402, the circuit size is substantially not increased. More specifically, in comparison with an increase in the circuit size of a configuration using echo cancellers of a high operating frequency, the increase in the circuit size due to the combination the echo canceller 402 of the low operating frequency and the sampling rate convertors are relatively very small. The sampling rate convertor formed from the FIR filter, as described above, can easily be assembled into the same package for the echo canceller 402, therefore not leading to an increase in the circuit area size.

It is to be understood that the present application is not limited to the embodiment described above, but is capable of easily converting the sampling rate frequency to any one of all frequencies of, for example, 64 kHz, 88.2 kHz, 128 kHz, 176.4 kHz, and 192 kHz used for sampling of audio signals.

In the embodiment described above, while the same sampling frequencies are set for all the AD/DA convertors by way of one example case for hardware selection, they also are not essential. For example, in the present embodiment, when the sampling frequency of the AD convertor 202 is set to 48 kHz independently of sampling frequencies of other AD/DA convertors, the sampling rate convertor 302 (D.S.) does not have to be provided.

Further, although not particularly shown and described in the present embodiment, the embodiment can be operated with any one of various numbers of channels, such as 1 channel (monaural), 2 channels (stereo), 5.1 channels (surround), and 7.1 channels (surround).

Further, in the present embodiment, the preprocessor 503 is provided to collectively perform the preprocess after mixing of the signal from the remote terminal and the auxiliary input (AUX) signal. However, two preprocessors can be provided independently of one another for performing the preprocess of the signal from the remote terminal and the auxiliary input (AUX) signal. Further, even in the case where, while the mixed signal of the signal from the remote terminal and the auxiliary input (AUX) signal is input, it is guaranteed that no excessively high or large input is supplied, the compression process of the preprocess is not indispensably necessary. Further, in the case where the number of channels is single, or even in the case of a multi-channel signal without inter-channel correlative components, the process of removing correlative components are not necessary as a matter of course.

Further, in the embodiment described above, while the recording terminal 104 (REC) is provided as an exemplary configuration component, the terminal is not indispensable. In the case where the recording terminal 104 (REC) does not exist, the DA convertor 204 (DAC) and summing device 604 can be removed from the configuration shown in FIG. 1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An audio communication system comprising:
    a first analog/digital convertor that converts a first audio signal to a first data signal, the first audio signal being input from a microphone;
    a second analog/digital convertor that converts a second audio signal to a second data signal, the second audio signal being input from an auxiliary input terminal; and
    an echo canceller that, when a third audio signal transmitted from outside is received and output from a speaker, prevents an output of the speaker from being input through the microphone and echoed back to a recipient or remote device,
    wherein an operating frequency of the echo canceller is lower than a first sampling frequency of the second analog/digital convertor.

2. An audio communication system according to claim 1, wherein a second sampling frequency of the first analog/digital convertor and the first sampling frequency of the second analog/digital convertor are the same.

3. An audio communication system according to claim 1, further comprising a sampling rate convertor between the first analog/digital convertor and the echo canceller, the sampling rate convertor converting a second sampling frequency to meet with the operating frequency of the echo canceller.

4. An audio communication system according to claim 1, further comprising a sampling rate convertor downstream of the echo canceller, the sampling rate convertor converting a second sampling frequency of the first analog/digital convertor and the first sampling frequency of the second analog/digital convertor to meet with one another.

5. An audio communication system according to claim 1, further comprising a sampling rate convertor that converts a third sampling frequency of the third audio signal transmitted from the outside to meet with the operating frequency of the echo canceller before the third audio signal is input into the echo canceller.

* * * * *